July 29, 1958 R. C. NORRIE ET AL 2,845,133
CAB-BESIDE-ENGINE VEHICLE
Filed June 14, 1954 10 Sheets-Sheet 1

INVENTORS
Robert C. Norrie
BY  Gideon Kramer

July 29, 1958

R. C. NORRIE ET AL 2,845,133

CAB-BESIDE-ENGINE VEHICLE

Filed June 14, 1954

INVENTORS
Robert C. Norrie
Gideon Kramer
BY
Barnes, Seed & Secrest
atty's

July 29, 1958   R. C. NORRIE ET AL   2,845,133
CAB-BESIDE-ENGINE VEHICLE
Filed June 14, 1954   10 Sheets-Sheet 4

INVENTORS
Robert C. Norrie
Gideon Kramer

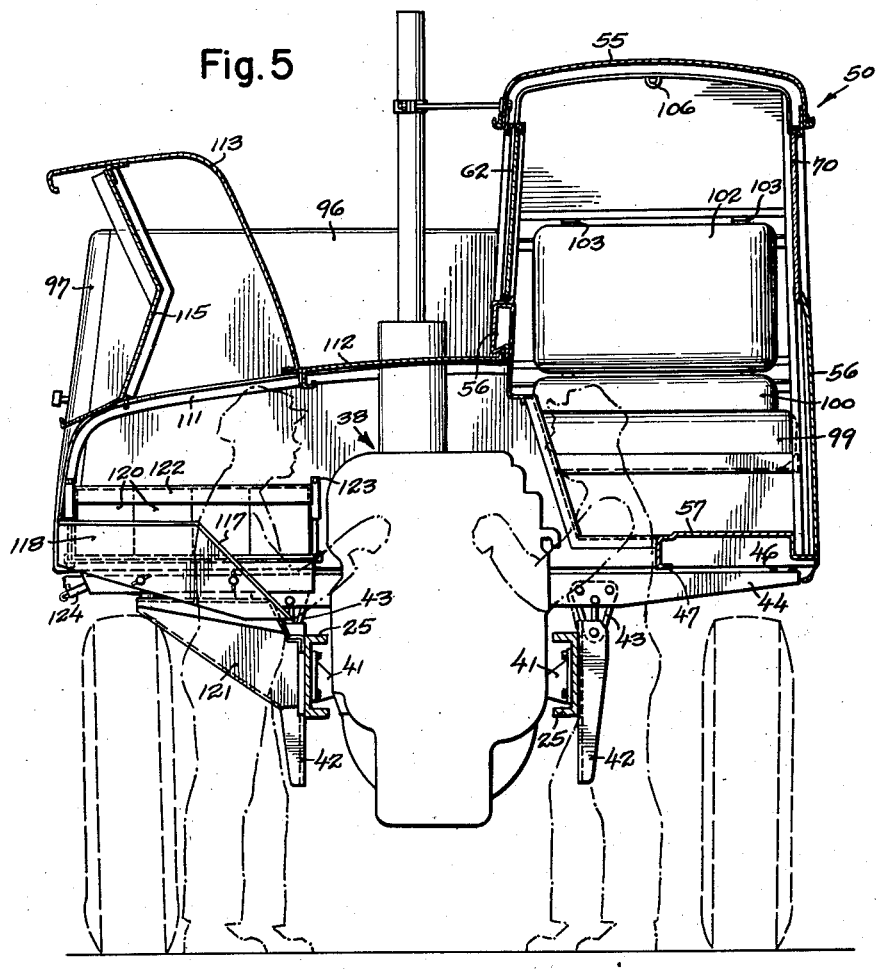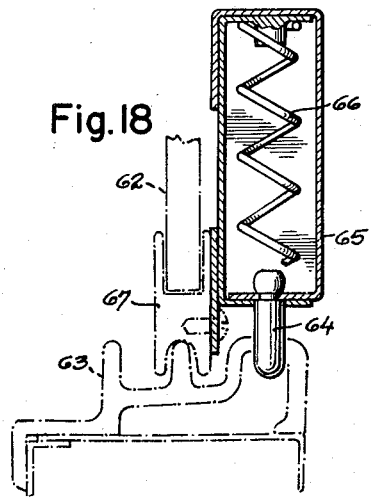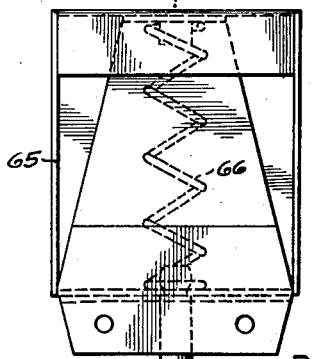

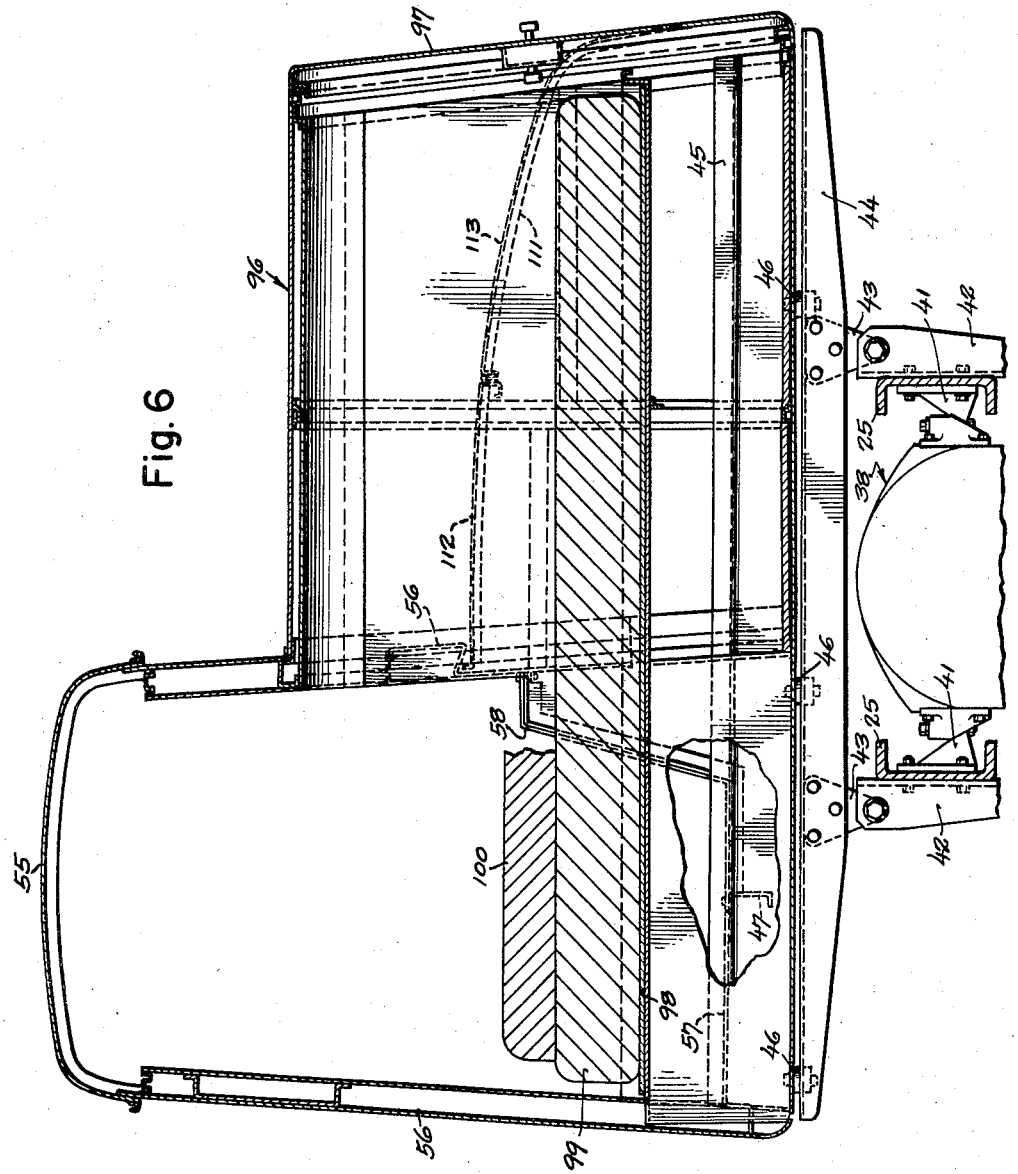

July 29, 1958 R. C. NORRIE ET AL 2,845,133
CAB-BESIDE-ENGINE VEHICLE
Filed June 14, 1954 10 Sheets-Sheet 7
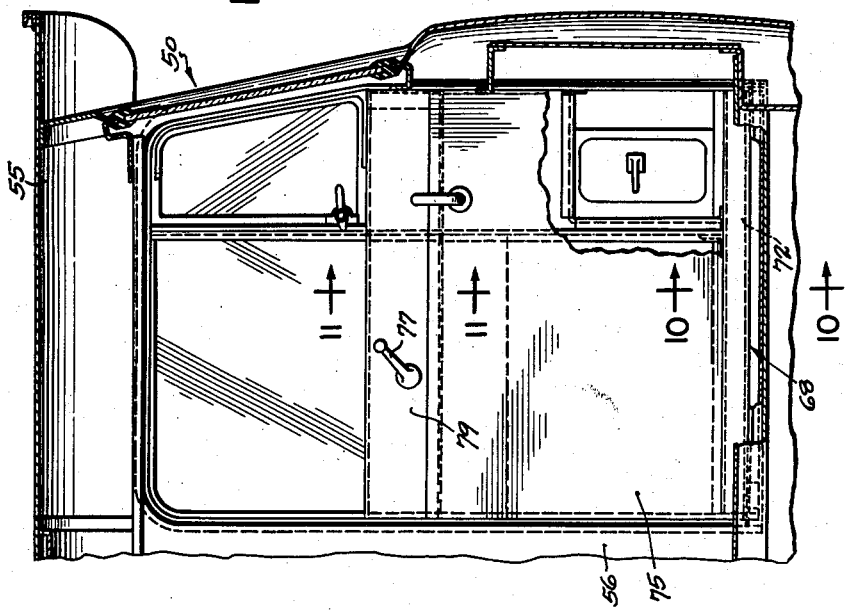
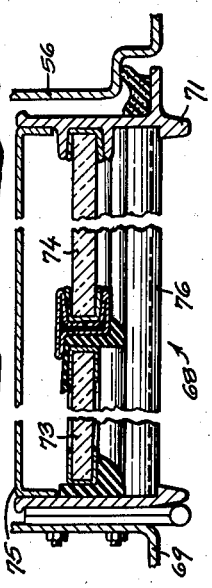
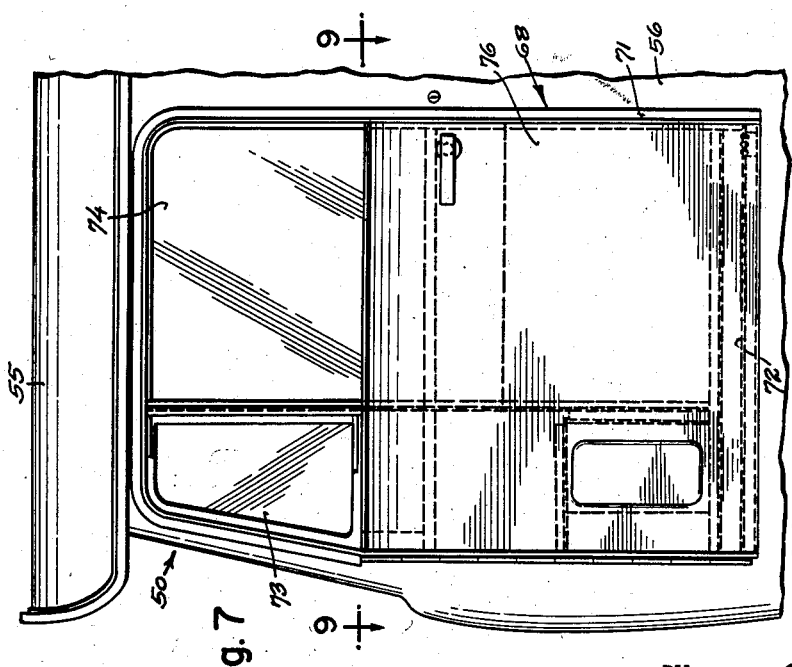
INVENTORS
Robert C. Norrie
Gideon Kramer July 29, 1958   R. C. NORRIE ET AL   2,845,133
CAB-BESIDE-ENGINE VEHICLE
Filed June 14, 1954   10 Sheets-Sheet 8
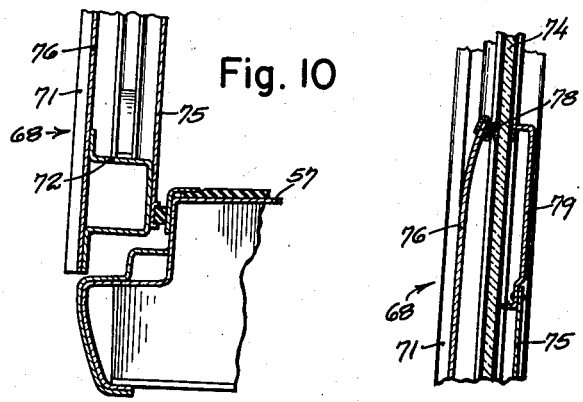
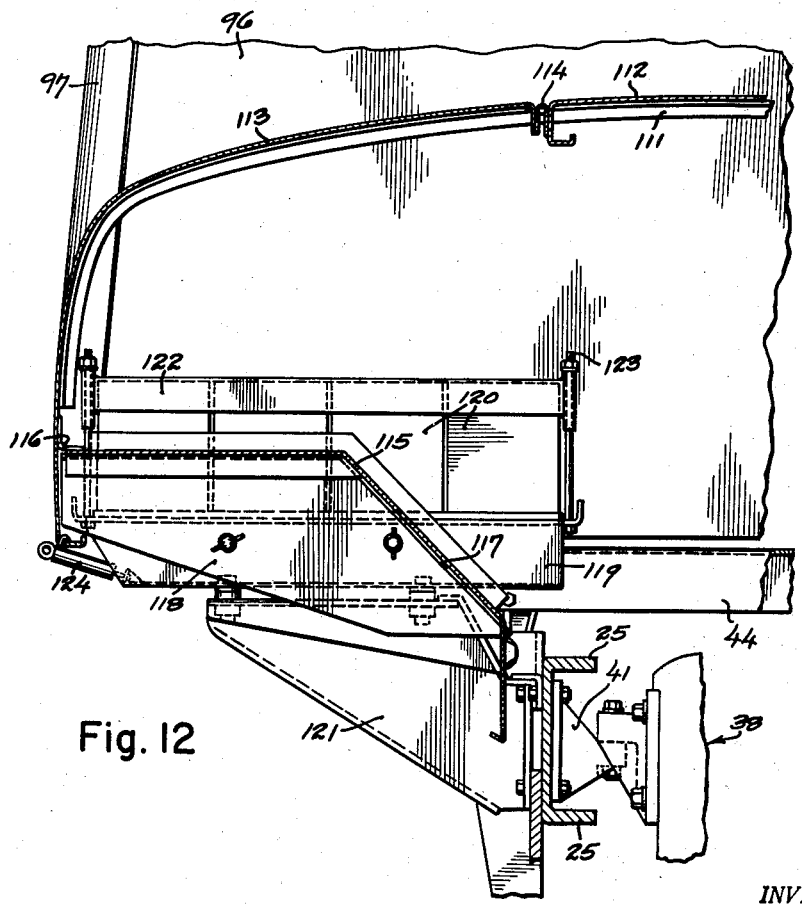
INVENTORS
Robert C. Norrie
Gideon Kramer
BY

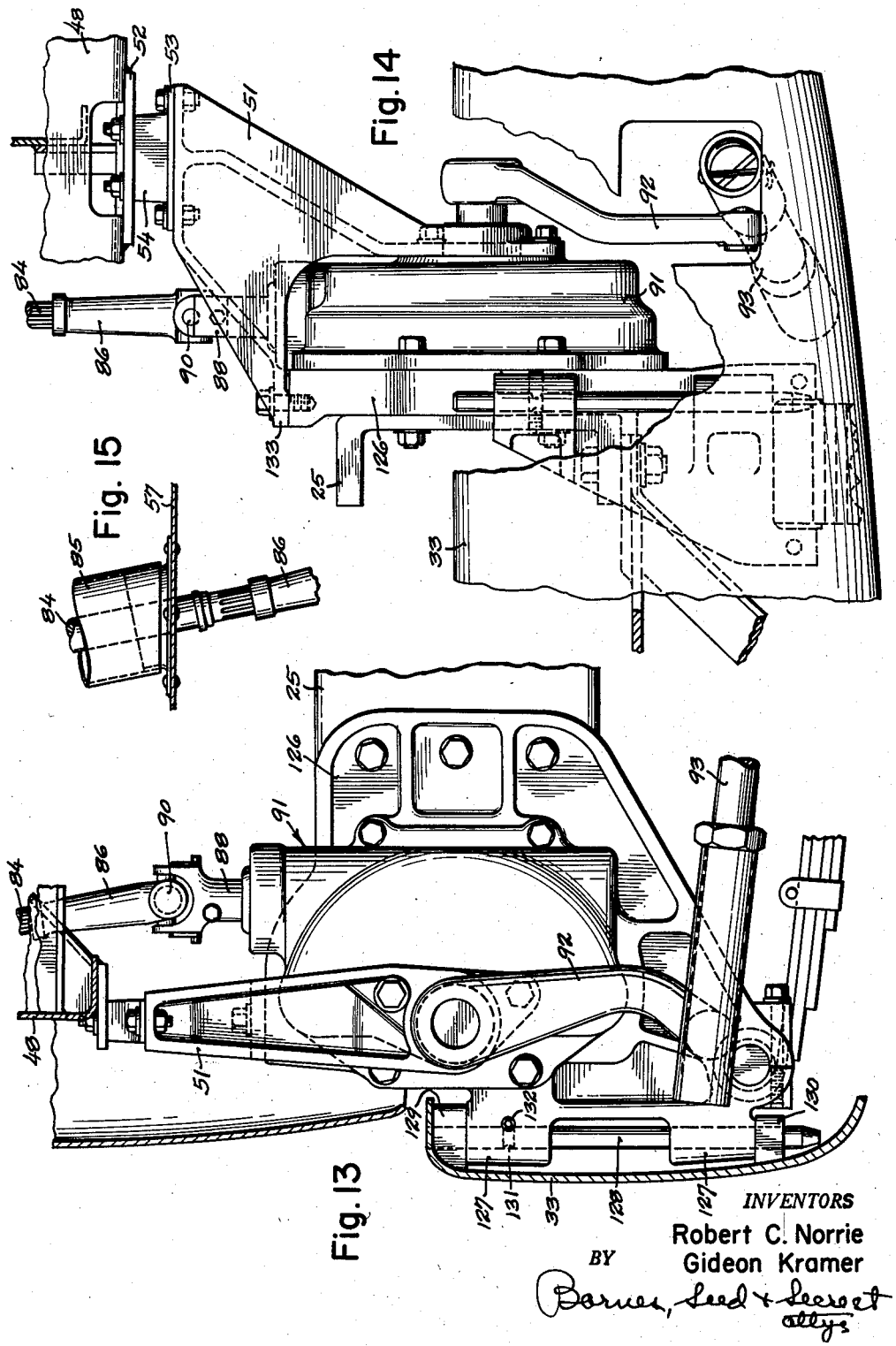

INVENTORS
Robert C. Norrie
Gideon Kramer

United States Patent Office 2,845,133
Patented July 29, 1958

2,845,133

CAB-BESIDE-ENGINE VEHICLE

Robert C. Norrie and Gideon Kramer, Seattle, Wash., assignors, by mesne assignments, to Pacific Car and Foundry Company, a corporation of Washington Application June 14, 1954, Serial No. 436,569

16 Claims. (Cl. 180—69)

This invention relates to automotive vehicles, trucks in particular, and for its principal object aims to provide a vehicle of this nature characterized in that the cab for the driver of the truck occupies a position to one side of the engine.

As a further and important object the invention purposes to provide an automotive vehicle of all-aluminum construction so as to very appreciably reduce the weight by comparison with existing trucks and thus permit the truck to carry a greater pay load.

A further object still is to provide a cab-beside-engine truck incorporating sleeping accommodations so as to permit long-haul operation of the truck with two drivers working successive shifts, and with such sleeping accommodations so engineered into the truck as to take up a minimum of usable cargo space and also to provide, in said sleeper, an arrangement by which the off-duty driver may either sit up or recline in comfort and wherein the seat takes up no additional space beyond that required for the bed.

As a yet further important object, the invention aims to provide a truck which may be serviced with unusual ease, giving ready access to both sides of the engine, and wherein a mechanic working on the engine from the right side thereof is sheltered from the weather by the hood of the engine compartment and derives shelter, when working on the engine from the left side, from the cab of the truck.

The invention has the still additional object of providing a truck placing the driver closer to the front-end limit of the vehicle than in any previous truck of which we are aware, hence providing superior driving visibility.

A yet additional object of the invention is to provide a truck which is trim and functional in appearance, and which, while departing rather radically from generally accepted truck lines, attracts wide attention with practically instant acceptance.

The foregoing, with still additional objects and advantages concerned more especially with advanced construction and mounting of very nearly all parts of the truck other than the basic frame and running gear, will appear and be understood in the course of the following description and claims, the invention consisting in the novel construction and in the adaptation and combination of parts hereinafter described and claimed.

In the accompanying drawings:

Fig. 5 is a transverse vertical sectional view taken on line 5—5 of Fig. 3, with the hood for the engine compartment raised and with the cab's removable wall panel removed, the view incorporating a schematic showing of two mechanics working upon the engine from the two sides thereof.

Fig. 6 is a fragmentary transverse vertical sectional view drawn to an enlarged scale on line 6—6 of Fig. 3.

Fig. 7 is an enlarged-scale fragmentary side elevational view detailing the door for the driver's cab.

Fig. 8 is a fragmentary longitudinal vertical section viewing said door from the interior of the cab, the scale being the same as that of Fig. 7 and the section line being shown at 8—8 of Fig. 3.

Fig. 9 is a fragmentary enlarged-scale horizontal sectional view on line 9—9 of Fig. 7.

Figs. 10 and 11 are fragmentary enlarged-scale transverse vertical sectional views on lines 10—10 and 11—11, respectively, of Fig. 8.

Figure 4:
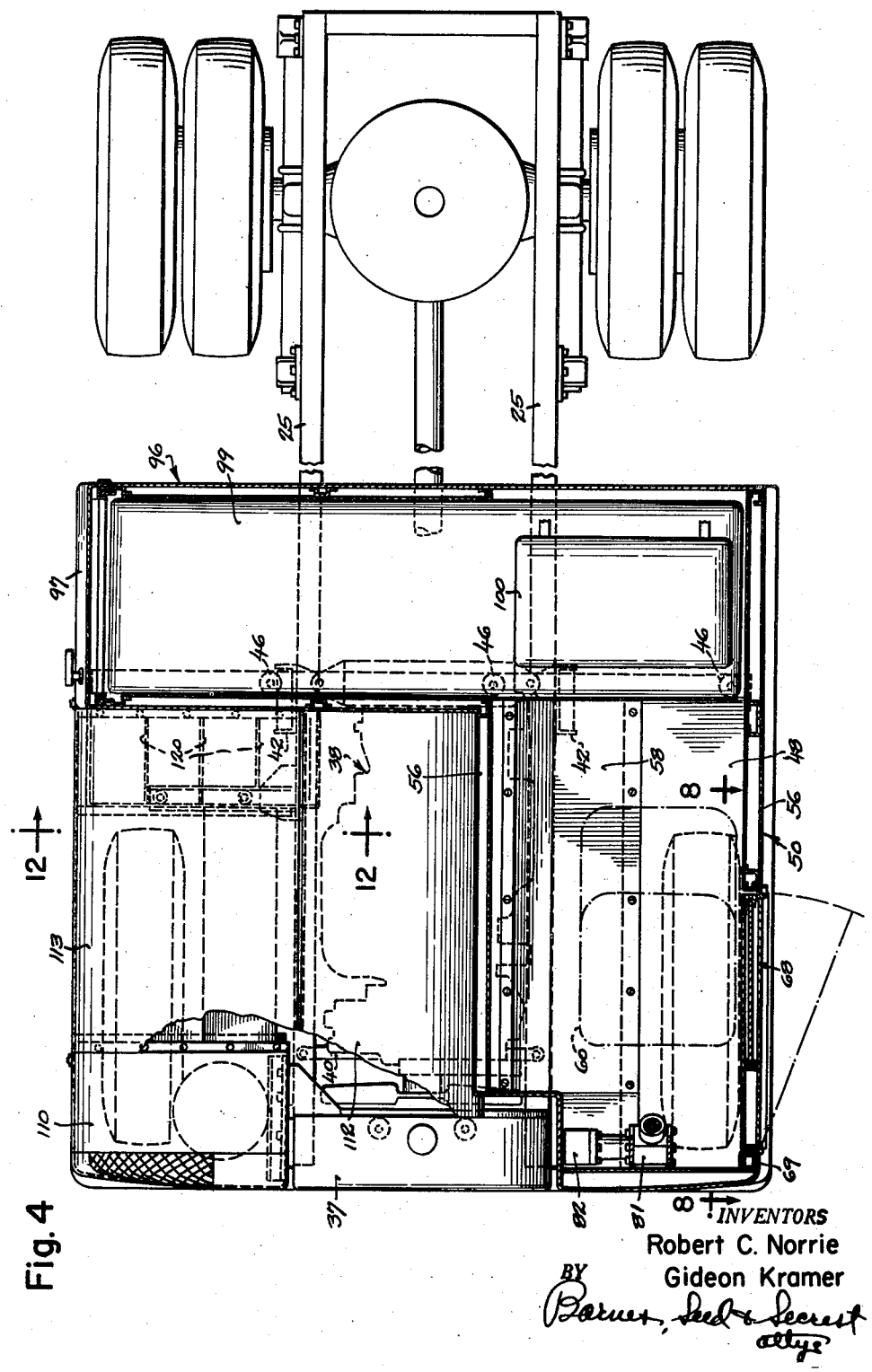
Fig. 4 is a horizontal sectional view on line 4—4 of Fig. 3, and with a part of the engine compartment's hood broken away.

Fig. 12 is a fragmentary transverse vertical sectional view drawn to an enlarged scale on line 12—12 of Fig. 4.

Fig. 13 is an enlarged-scale fragmentary longitudinal vertical sectional view detailing the arrangement by which a worm and sector which are housed in a box which is fixedly secured to the longitudinal principals of the vehicle frame establish a steering hook-up from the vehicle's steering wheel to a pitman arm which connects in turn with the vehicle's steerable front wheels by the usual draglink and steering arm.

Fig. 14 is a fragmentary front elevational view of said steering elements and incorporating a fragmentary showing of the vehicle's front bumper.

Fig. 15 is a fragmentary longitudinal vertical sectional view drawn to a yet larger scale to detail the manner in which an offset extension of the vehicle's steering column foots upon the floor of the cab.

Figure 16:
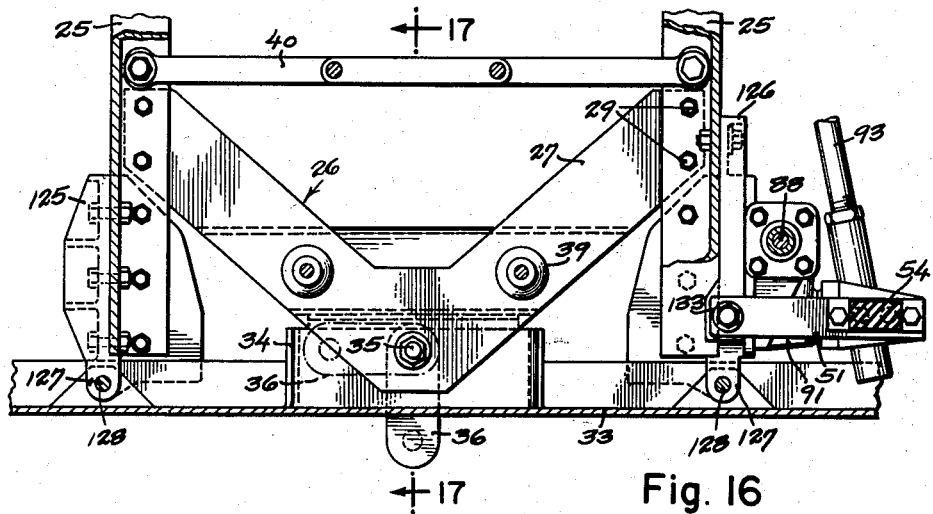
Figure 17:
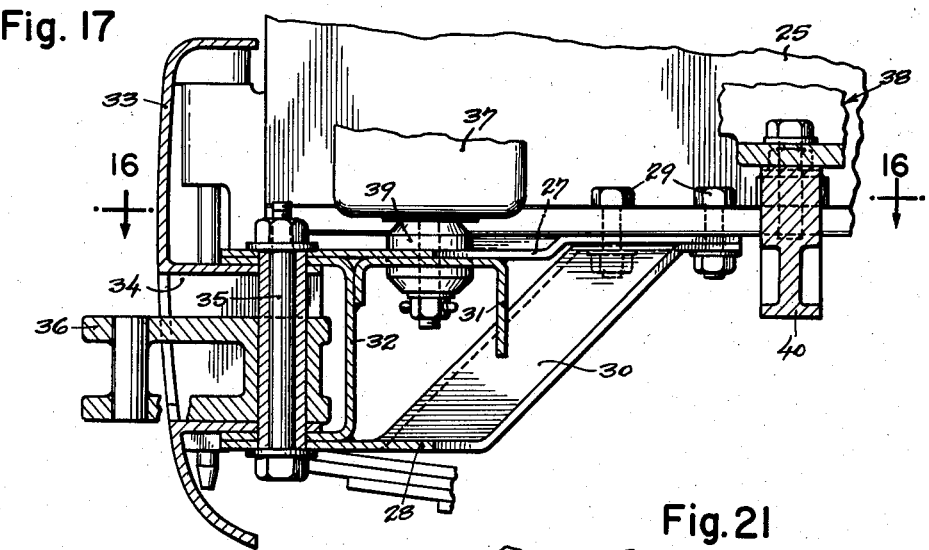

Fig. 16 is a fragmentary horizontal sectional view detailing a V-brace which is engineered into the front end of the vehicle's frame, the section line being shown at 16—16 in Fig. 17.

Fig. 17 is a fragmentary longitudinal vertical sectional view drawn to an enlarged scale on line 17—17 of Fig. 16.

Fig. 18 is a large-scale transverse vertical sectional view detailing the latch structure which is provided for the horizontally slidable right side windows of the driver's cab, the section line therefor being shown at 18—18 in Fig. 19.

Fig. 19 is an elevational view of said latch structure.

Figure 21:
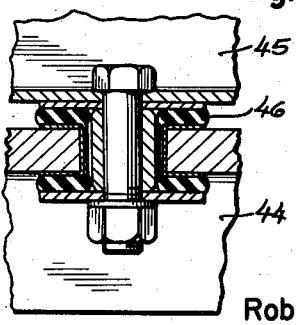
Figure 20:
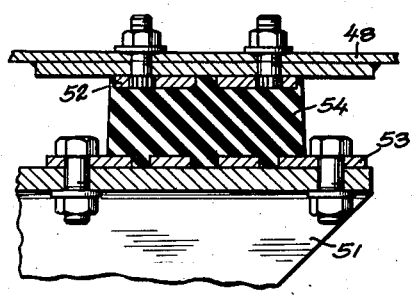

Fig. 20 is a large-scale vertical sectional view detailing the front-end mounting for the cab; and Fig. 21 is a large-scale vertical sectional view detailing one of the two rear-end mountings for the cab.

Referring to said drawings, our all-aluminum vehicle provides a basic frame composed of two transversely spaced longitudinal channel members designated by the numeral 25 and suitably connected at intervals of the length by a number of cross members. One of these cross-members, and namely a front-end V-brace 26, is considered to be of particular moment. This brace (see Figs. 16 and 17) is composed of complementing upper and lower spanner plates 27 and 28, respectively, each having a matching V-shaped plan configuration, bolted as at 29 to the frame principals 25 with the apex or point of the V lying to the front. An offset 30 provided in the lower said plate produces a fork at the front, and welded into said fork with a backing stiffener 31 is a forwardly facing triangular channel section 32. A specially designed bumper 33, hereinafter more particularly described, presents a tunnel portion 34 which fits the opening in said channel section, and pivotally mounted by a vertical bolt 35 in this tunnel is a tow-link 36.

A radiator 37 for the engine 38 of the vehicle has its base bolted, with intervening rubber mountings 39, to said V-brace, and has its upper end steadied from the engine by stay rods (not shown). The engine takes its support at three points, finding a central mounting at the front upon a framing cross member 40 lying to the immediate rear of the V-brace, and at the rear resting at each side upon a bracket 41 bolted to a respective frame principal.

In the approximate transverse vertical plane of said engine brackets 41 there is bolted to the outside of each frame principal 25 a respective channel section 42. Bolted in surmounting relation to these channel sections are respective brackets 43, and bolted in turn to these brackets 43 is a framing cross-member 44 having each of its two ends projecting well beyond the frame principals 25. A special channel section 45 is boltably secured with intervening rubber mountings 46 in overlying relation to said cross-member 44 so as to extend transversely of the vehicle for substantially the entire width thereof. The outrigger portion of such special section which projects at the left side of the vehicle laterally beyond the related main frame principal 25 has a forwardly extending channel section 47 welded thereto, and this section 47, together with said left-side outrigger portion of the section 45, and a double-L section 48 which is welded to the section 47 at the front end thereof, produces a frame for a driver's cab 50. Such frame has a 3-point rubber mounting. Two of said points are provided by two of said rubber mountings 46 spaced apart transversely of the vehicle so as to occur one said mounting at the approximate outer side limit and the other said mounting at the approximate inner side limit of the cab. The third point of suspension sustains the front section 48 of the cab frame upon a post 51 which is bolted to the vehicle's main frame, and occurs at or adjacent the longitudinal median line of the cab. The nature of this front-end mounting will be apparent from an inspection of Fig. 20, being comprised of plates 52 and 53 vulcanized to the top and to the bottom faces, respectively, of a block 54 of elastic rubber, the plates being boltably secured to the frame section 48 and to the post, respectively.

More especially in connection with said cab 50, the same provides a visored roof 55 and its side walls are each comprised of a hollow shell 56 stiffened at suitable intervals by vertical posts. For the floor approximately the outer one-half thereof is permanently closed by a plate 57 running front to rear. The inner one-half of the cab's floor and the lower portion of the inner side wall is closed by a removable panel 58 having an angular shape when viewed from the end, such panel being made removable so as to enable the interior of the cab to be brought into communication with the engine compartment. As schematically illustrated in Fig. 5, removing this panel together with the driver's seat 60, both of which can be quickly accomplished, permits a mechanic to work upon the engine from the inner or cab side, either standing erect or sitting upon the flat platform which is provided by the floor plate 57.

A window opening is provided in the inner or right side wall of the cab running for approximately the entire length thereof, and received in this opening are a pair of windows 62 slidable horizontally in ways presented by an extrusion 63 which extends along the bottom edge of the window opening. For releasably locking these windows there is provided a respective latching bolt 64 carried by a slidably mounted box 65 which is manually retractable against the force imposed by a spring 66. This lock is detailed in Figs. 18 and 19, and there is incorporated in the former such view a broken-line illustration of the extrusion 63, one of the two windows 62, and a pane-carrying rail 67. This rail extends only along the bottom edge of the window pane.

In the cab's outer side wall there is provided an access door 68 swingable outwardly about a hinge pin carried by a front corner post 69, and to the rear of this door there is a permanently closed window 70.

The construction of said door is detailed in Figs. 7 through 11 and is considered to be novel in its provision of a framework comprised of an extrusion 71 extending as a substantial yoke along each side and across the top, and connected at the bottom by a spanning channel 72 welded to said extrusion. Upon the inside and outside surface of the door below the windows 73 and 74 there is provided a respective covering skin, as 75 and 76, welded to the framework, and with the skin 75 being augmented at the top by a separate panel 79 carrying the mechanism, including an exposed handle 77, for raising and lowering the window 74. The skin 76 bends inwardly at the top and along its upper edge carries a flexible strip 78 wiping the outer face of the window.

Within the cab are the usual controls, and namely brakes, throttle, gear shift lever, and steering gear, with the former two controls being deleted from the drawings for simplicity in illustration. The steering motions given to the steering wheel 80 are transferred, by bevel gears contained in two rigidly mounted boxes 81 and 82, from the spindle of the main steering column 83 to a spindle 84 housed in a laterally offset column extension 85 which foots upon the floor of the cab. This housed spindle 84 lies more or less vertical and projects by its lower end below the floor of the cab whereat the same finds spline connection with an extension 86. A stub shaft 88 connecting by a universal 90 with said shaft extension 86 carries the steering movements into a reduction gear box 91 containing a worm and a worm-toothed sector gear, and responding to the movements of the sector gear is a pitman arm 92 arranged to have its free ends partake of fore-and-aft movement about a transverse horizontal axis. From the free end of the pitman arm a drag-link 93 extends longitudinally of the vehicle to a steering arm 94. The customary tie-rod extends from the steering arm at one side to the steering arm at the other side of the vehicle.

Figure 3:
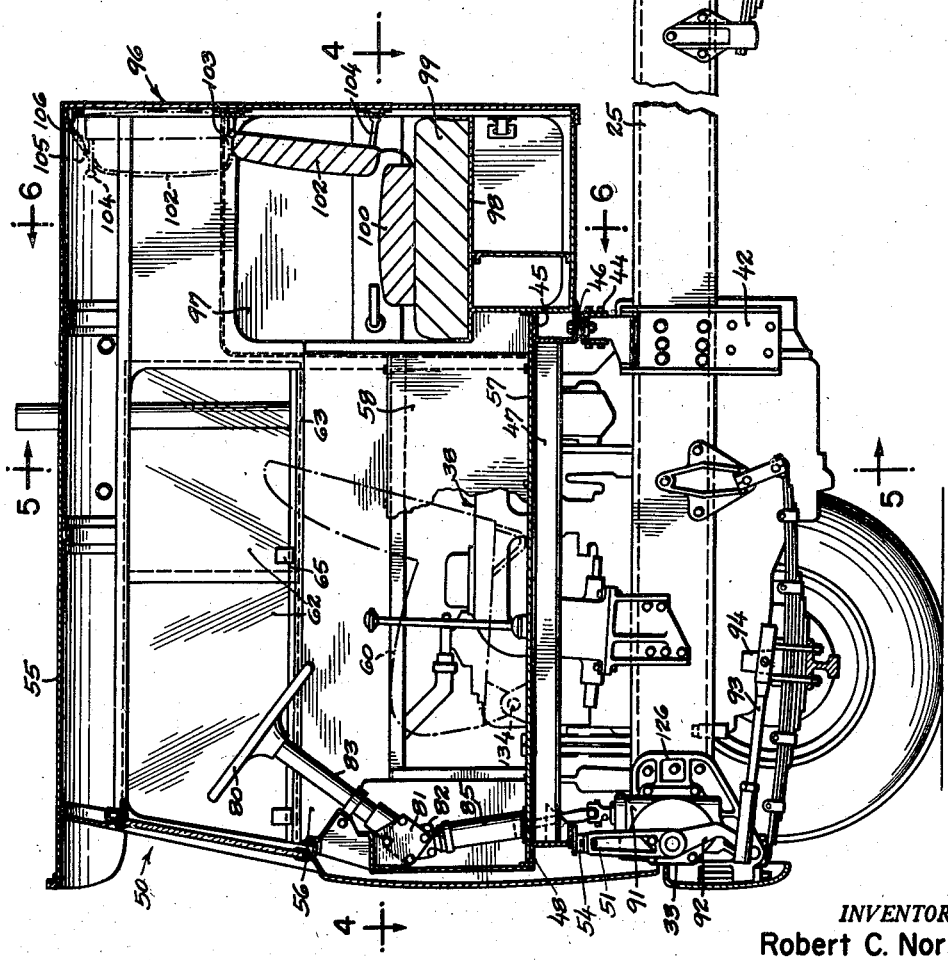
Fig. 3 is a fragmentary longitudinal vertical sectional view on line 3—3 of Fig. 2, and with a portion of a removable wall panel separating the engine compartment from the interior of the cab being broken away.

Designated by 96 and joined to the cab at the rear thereof is a sleeper extending substantially the entire width of the vehicle. The rear end of the cab is entirely open to this sleeper so as to bring the interiors into communication, and there is also provided for the sleeper, in the outside wall thereof, a separate access door 97. A bunk 98 provided in the sleeper is fitted with a sleeping pallet 99 of air foam rubber or other suitable construction. As an adjunct to said sleeping pallet, for use during periods when the off-duty driver may desire to sit up rather than recline, there is provided a seat cushion 100 attached by straps to a back rest 102. This back rest pivots at its upper edge to a mounting bracket 103 and adjacent its lower edge carries a rigid leg or legs 104 arranged, when the back rest occupies the operating position in which it is shown by full lines in Fig. 3, to bear against the back wall of the sleeper and properly position said rest. As shown by dotted lines in said view, the back rest and seat cushion swing upwardly into an out-of-the-way position when not in use, and for holding the same in such inoperative position there is provided a strap 105 which attaches to a ceiling ring 106.

Now reverting to the engine compartment, it will be apparent from an inspection of the drawings that there is provided to the front of such compartment, in addition to the radiator 37, a corner cowl 110. This cowl is anchored securely to the radiator, relying upon the latter for its entire support. When viewed from the front the radiator and the cowl present a relatively unbroken profile, and producing a substantial counterpart of this profile at the rear of the engine compartment is an extrusion 111 made sectionally to an angular shape and secured, as here shown, to the front wall of the sleeper but which may surmount a separate bulkhead (not shown). An inner portion of the engine compartment is permanently covered by a fixed roof 112. For the outer portion there is provided a hood 113 hinged, as at 114, to said fixed cover so as to admit of being raised. An apron 115 is hinged, as at 116, to the underside of the hood adjacent the free edge of the latter, and when the hood occupies the closed position in which it is shown in Fig. 12 said apron serves as a dust shield for the engine, resting by each of its two side edges upon a respective flange, as 117, one of which is attached to the back side of the corner cowl and the other of which is made integral with an end guard 118 which is removably secured to the front side of a platform 119 disposed at the outside rear corner of the engine compartment and serving as a support for a plurality of storage batteries 120. This platform is rubber-mounted, taking its support from an outrigger bracket 121 bolted to one of the frame principals 25. A rectangular headpiece 122 of angular cross-section fits over the batteries and is secured in place by nutted bolts 123. Hold-down hooks for the hood 113 are denoted by 124.

While not illustrated in the drawing the apron 115 has a spur secured at the right side adjacent the free edge. When the hood is raised this spur is adapted to lodge in a socket provided by the cowl 110. It will be seen from an inspection of Fig. 5 that the design of the hood and the manner of supporting the same in a raised position enables a mechanic to work freely upon the engine from the outer side thereof with substantial protection from the weather.

Now considering the mounting of the vehicle's front bumper 33, there is secured to the two frame principals 25 a right-hand bracket 125 and a left-hand bracket 126, and presented by each such bracket is a respective forwardly projecting lug or lugs 127 which are drilled to accommodate a vertical pin 128. The bumper 33 presents upper and lower bosses 129 and 130 drilled to register with the drill-holes of said lugs. A circumscribing groove 131 is provided on each pin, and for locking engagement in these grooves screws 132 are threaded into the lugs. It will be seen from an inspection of Figs. 14 and 15 that the left-hand bracket 126 underlies and forms a mounting base for the gear box 91, and that the post 51 is bolted in turn to the gear box while providing a lateral extension 133 which overhangs and is bolted to the top of the bracket.

Figure 1:
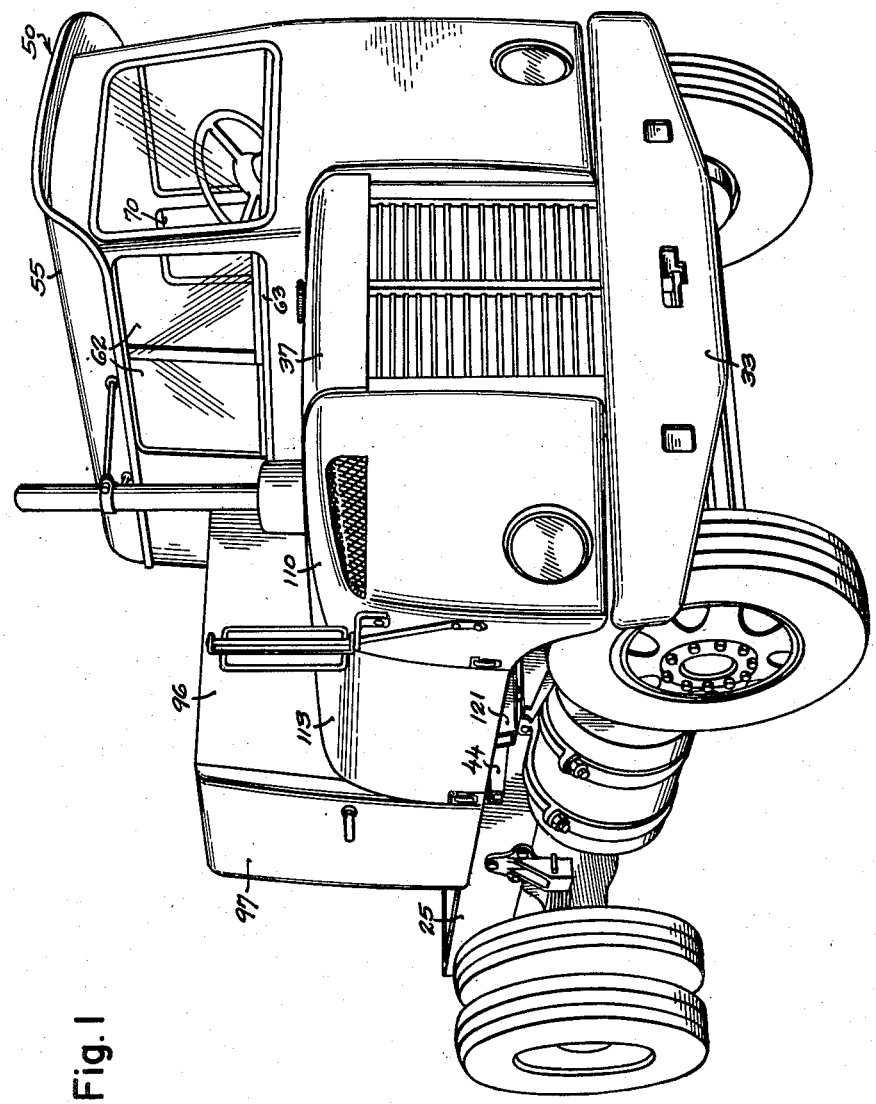
Figure 1 is a perspective front-end view of a cab-beside-engine truck constructed in accordance with the preferred teachings of the present invention.
Figure 2:
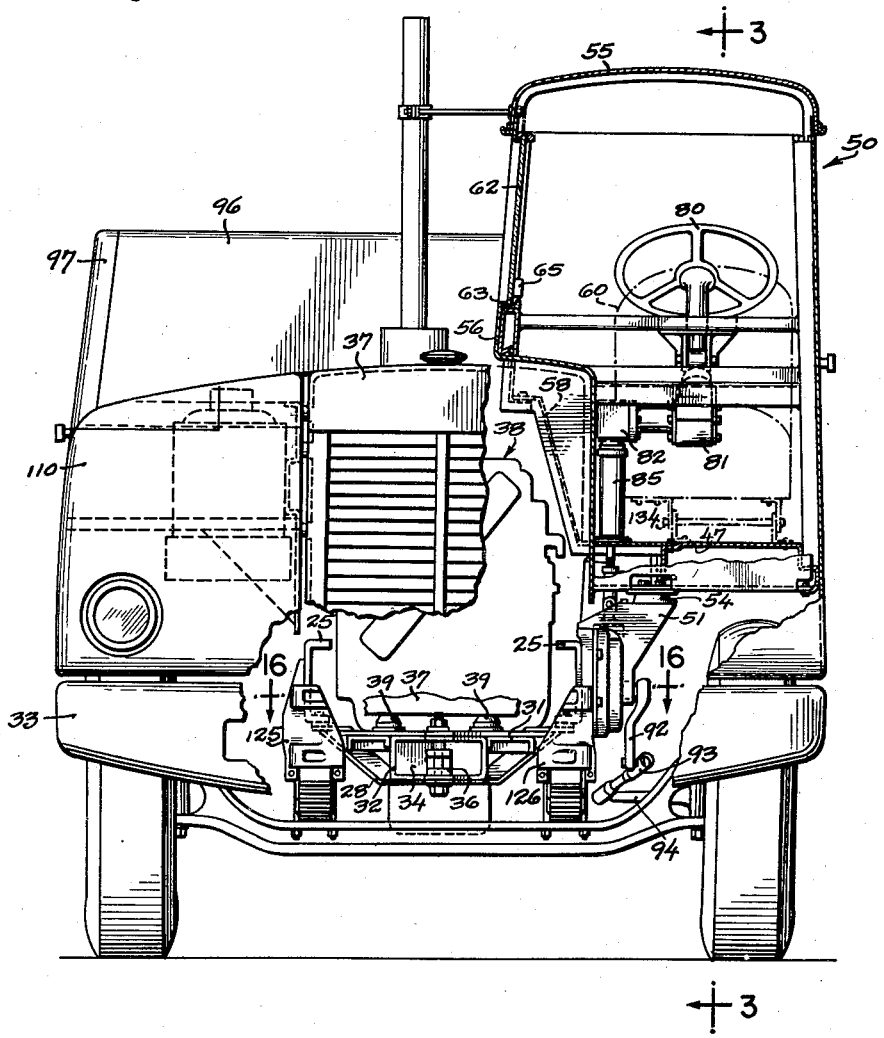
Fig. 2 is a front elevational view thereof with parts broken away and shown in section so as to illustrate the interior of the cab and a portion of the engine compartment.

It is thought that the invention, and its advantages, will have been clearly understood from the foregoing detailed description of the now-preferred illustrated embodiment. It is self-evident that the sleeper can be dispensed with, where the use to which the vehicle is to be put does not call for same, and where this is done a second seat (not shown) to accommodate a spare driver is provided within the cab, the two seats being disposed in tandem and which is to say with the spare seat being disposed to the immediate rear of the driver's seat. As can be seen from an inspection of Figs. 2 and 3, the driver's seat 60 may be swung forwardly about a front pivot mounting 134 into an out-of-the-way position giving access through the cab door 68 to the spare seat or, where the sleeper is attached, to the interior of the latter.

It is apparent that other changes from the illustrated and described embodiments may be resorted to without departing from the spirit of the invention and it is accordingly our intention that no limitations be implied and that the hereto annexed claims be given a scope fully commensurate with the broadest interpretation to which the employed language admits.

What we claim, is:

1. In an automotive vehicle, in combination with a main frame, a radiator supported by said frame to occupy a position at the front end thereof on the approximate longitudinal median line of the vehicle, a driver's cab supported by the frame to occupy a position at one side of said radiator with its front end approximately flush therewith and extending rearwardly therefrom, a bulkhead extending transversely of the vehicle from approximately the rear limit of said cab to the side limit of the vehicle opposite said cab, said bulkhead at the rear and said radiator at the front, together with a cowl extending laterally from the radiator, defining an engine compartment, an engine in said compartment, a permanent roof covering an inside portion of said engine compartment, a hinged hood removably covering the outer portion of said engine compartment, and an apron hinged to the underside of said hood adjacent the free edge thereof to act as a prop when the hood is raised and performing the function of a dust shield when the hood is closed.

2. In an automotive vehicle, in combination with transversely spaced longitudinal principals of a main frame, a brace fixed to and extending transversely between said principals at the front end of the frame, a radiator supported upon said brace, an engine supported by said frame to occupy a position between the principals to the immediate rear of the radiator, a cross member component of the main frame extending transversely of the vehicle to the immediate rear of the engine and projecting by its two ends laterally well beyond opposite sides of the frame principals, a driver's cab lying to one side of the engine and deriving support for its rear end from said cross member, a post secured to the frame and giving support to the front end of the cab, a cowl rigidly attached to the radiator and extending laterally therefrom at the side thereof opposite the cab, said radiator and cowl presenting a substantial continuous profile when viewed from the front, a bulkhead at the rear of the engine supported by said cross member and having a profile configuration substantially matching that of the radiator and cowl, a permanent roof extending between the radiator and the bulkhead to cover the approximate inner one-half portion of the compartment containing said engine, and a hinged hood removably covering the approximate outer one-half portion of said engine compartment.

3. The automotive vehicle of claim 2 in which the back wall of the cab is open, and a sleeping compartment extending the approximate full width of the vehicle to the immediate rear of the cab, said sleeping compartment being attached to the cab and communicating by said back-wall opening with the interior of the cab.

4. The automotive vehicle of claim 2 having an apron hinged to the underside of the hood adjacent the free edge of the latter and serving the two-fold function of (1) shielding the outer side of the engine compartment against road dust when the hood is closed, and (2) propping the hood in an open position when the hood is raised.

5. The automotive vehicle of claim 2 in which the inner side wall of the cab includes a removable panel giving access to the engine compartment from the interior of the cab.

6. The automotive vehicle of claim 3 in which the cab and the sleeping compartment are each composed of sheet aluminum covering a framework of aluminum.

7. In an automotive vehicle, in combination with a main frame, a radiator supported by said frame to occupy a position at the front end thereof on the approximate longitudinal median line of the vehicle, a driver's cab supported by the frame to occupy a position at one side of said radiator with its front end approximately flush therewith and extending rearwardly therefrom, a bulkhead extending transversely of the vehicle from approximately the rear limit of said cab toward the side limit of the vehicle opposite said cab, said bulkhead at the rear and said radiator at the front defining an engine compartment, an engine in said compartment, a permanent roof covering an inside portion of said engine compartment, a hinged hood removably covering the outer portion of said engine compartment, and an apron hinged to the underside of said hood adjacent the free edge thereof to act as a prop when the hood is raised and performing the function of a dust shield when the hood is closed.

8. In an automotive vehicle, in combination with a main frame, a radiator supported by said frame to occupy a position at the front end thereof on the approximate longitudinal median line of the vehicle, a driver's cab supported by the frame to occupy a position at one side of said radiator with its front end approximately flush therewith and extending rearwardly therefrom, a bulkhead extending transversely of the vehicle from approximately the rear limit of said cab toward the side limit of the vehicle opposite said cab, said bulkhead at the rear and said radiator at the front defining an engine compartment, an engine in said compartment, a permanent roof covering an inside portion of said engine compartment, and a hinged hood removably covering the outer portion of said engine compartment.

9. In an automotive vehicle, in combination: a main frame providing transversely spaced longitudinally extending principals located one at one side and the other at the other side of the longitudinal median line of the vehicle, an engine supported from the main frame so as to occupy a position between said principals, an outrigger frame deriving its support from the main frame and extending laterally from said main frame, a driver's cab sustained by said outrigger frame so as to occupy a position alongside the engine, and a housing for the engine, the driver's cab extending well above the engine housing and having windows at the front and at both sides of the portion thereof which projects above the engine housing, said outrigger frame comprising members at each end secured to and projecting laterally from the main frame together with a longitudinal member extending as a stringer between said end members, said longitudinal stringer, the two end members, and the adjacent longitudinal principal of the main frame defining an opening the plan dimensions of which are sufficient to permit a person servicing the engine to stand erect therein.

10. Structure according to claim 9 in which the driver's cab has a removable wall panel normally closing said opening.

11. In an automotive vehicle, in combination: an engine, a hinged hood functioning as a removable cover for said engine, and an apron hinged to the underside of said hood adjacent the free edge thereof to act as a prop when the hood is raised and performing the function of a dust shield when the hood is closed.

12. In an automotive vehicle, in combination with a vehicle main frame including spaced apart principals extending longitudinally of the vehicle at opposite sides of the lonigtudinal median line, an engine supported by said frame to occupy a position at the front thereof between said principals, a housing for said engine, and a driver's cab supported by the frame to occupy a position at the front end to one side of the engine, said driver's cab extending well above the engine housing and having windows at the front and at both sides of the portion thereof which extends above the engine housing, the wall structure of said cab including removable panel sections operating as a closure for adjoining portions of the floor and inner side wall of the cab and acting when removed to give direct access from the interior of the cab to the near side of the engine and expose the ground surface beneath, the opening closed by said removable panel sections being of such a size and so positioned in relation to the near frame principal as to permit an individual servicing the engine to lower himself through said opening and stand erect on the ground at the outside of said near frame principal.

13. In an automotive vehicle, in combination: an engine, a housing for said engine, and a driver's cab occupying a position alongside the engine and extending well above the engine housing with windows for driver visibility at the front and at both sides of the portion of the cab which extends above the engine housing, the wall structure of said cab including removable panel sections operating as a closure for adjoining portions of the floor and inner side wall of the cab and acting when removed to give direct access from the interior of the cab to the near side of the engine and expose the ground surface beneath, the opening closed by said removable panel sections being of such a size as to permit an individual servicing the engine to lower himself through said opening and stand erect upon the ground.

14. In an automotive vehicle, in combination: a main frame providing transversely spaced longitudinally extending principals located one at one side and the other at the other side of the longitudinal median line of the vehicle, an engine supported from the main frame so as to occupy a position between said principals, an outrigger frame deriving its support from the main frame and extending laterally from said main frame, a driver's cab sustained by said outrigger frame so as to occupy a position alongside the engine, and a housing for the engine, the driver's cab extending well above the engine housing and having windows at the front and at both sides of the portion thereof which projects above the engine housing, the support given to the driver's cab from the outrigger frame being a 3-point rubber-mounted support with one of said three points lying at the front and the other two at the rear.

15. In an automotive vehicle, in combination: a main frame providing transversely spaced longitudinally extending principals located one at one side and the other at the other side of the longitudinal median line of the vehicle, an engine supported from the main frame so as to occupy a position between said principals, an outrigger frame deriving its support from the main frame and extending laterally from said main frame, a driver's cab sustained by said outrigger frame so as to occupy a position alongside the engine, a housing for the engine, a driver's cab extending well above the engine housing and having windows at the front and at both sides of the portion thereof which projects above the engine housing, a hinged hood functioning as a removable cover for said engine, and an apron hinged to the underside of said hood adjacent the free edge thereof to act as a prop when the hood is raised and performing the functions of a dust shield when the hood is closed.

16. In an automotive vehicle, in combination: a driver's cab, an engine compartment disposed alongside the cab, an engine housed in said engine compartment, and a sleeping compartment extending approximately the full width of the vehicle immediately to the rear of said cab and engine compartment, the sleeping compartment having an opening in its front wall communicating with the interior of the cab so that direct access is provided between said cab and the sleeping compartment, said sleeping compartment containing a pallet as an accommodation for sleeping together with a folding seat cushion and backrest movable from an inoperative out-of-the-way position into an operating position whereat the seat cushion rests upon the pallet and the backrest bears against the back wall of the sleeping compartment in a position giving the user vision forwardly through the cab.

References Cited in the file of this patent

UNITED STATES PATENTS

| Number | Name | Date |
| --- | --- | --- |
| 870,794 | Norris | Nov. 12, 1907 |
| 1,512,770 | Jakob et al. | Oct. 21, 1924 |
| 1,691,885 | Jandus | Nov. 13, 1928 |
| 1,701,574 | Ledwinka | Feb. 12, 1929 |
| 1,974,376 | Edwards | Sept. 18, 1934 |
| 2,064,100 | Batchman | Dec. 15, 1936 |
| 2,174,499 | Kounkel | Sept. 26, 1939 |
| 2,192,207 | Stahl | Mar. 5, 1940 |
| 2,336,511 | Stolte | Dec. 14, 1943 |
| 2,376,491 | Kinney | May 22, 1945 |

(Other references on following page)

UNITED STATES PATENTS

| | | | |
|---|---|---|---|
| 2,485,794 | Waterbury et al. | Oct. 25, | 1949 |
| 2,492,410 | Arps | Dec. 27, | 1949 |
| 2,529,200 | Swanson | Nov. 7, | 1950 |
| 2,532,057 | Carlson et al. | Nov. 28, | 1950 |
| 2,549,925 | Paton | Apr. 24, | 1951 |
| 2,566,871 | Bedford et al. | Sept. 4, | 1951 |
| 2,584,366 | Perry | Feb. 5, | 1952 |
| 2,667,379 | Baze | Jan. 26, | 1954 |
| 2,669,317 | Celien | Feb. 16, | 1954 |
| 2,761,523 | Lee | Sept. 4, | 1956 |
| 2,781,102 | Prichard | Feb. 12, | 1957 |

FOREIGN PATENTS

| | | | |
|---|---|---|---|
| 149,134 | Australia | Nov. 21, | 1952 |
| 483,158 | Great Britain | Apr. 13, | 1938 |

OTHER REFERENCES

"Peterbilt Cab over Engine Heavy Duty Trucks," Peterbilt Motors Co., 10700 MacArthur Blvd., Oakland, Calif. Pages 6 and 7.